D. F. BLACK,
COLLAPSIBLE POULTRY CRATE.
APPLICATION FILED FEB. 12, 1919.
1,340,815.
Patented May 18, 1920.
2 SHEETS—SHEET 1.
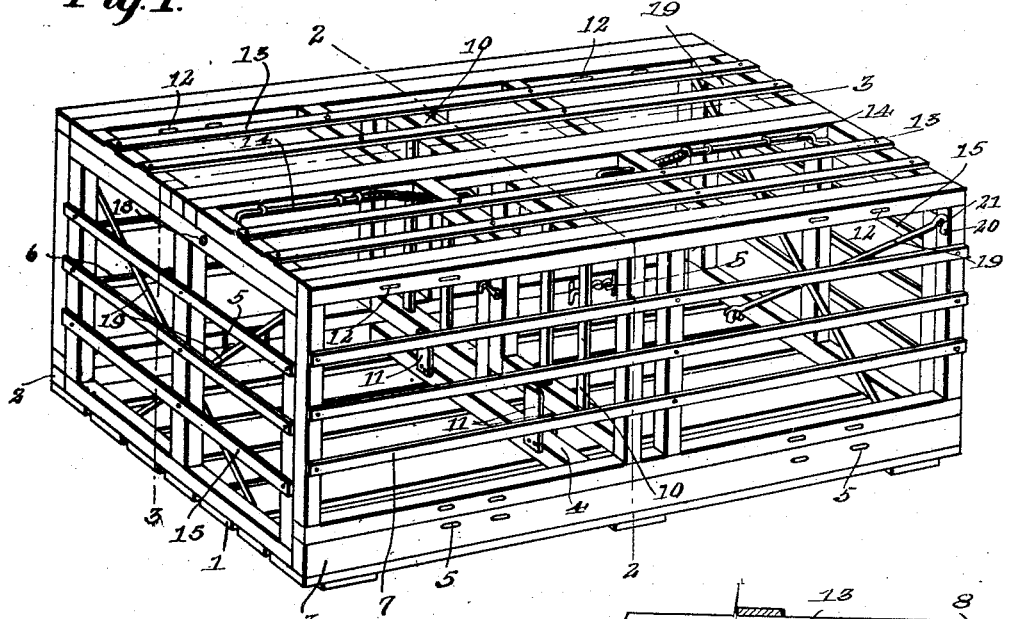
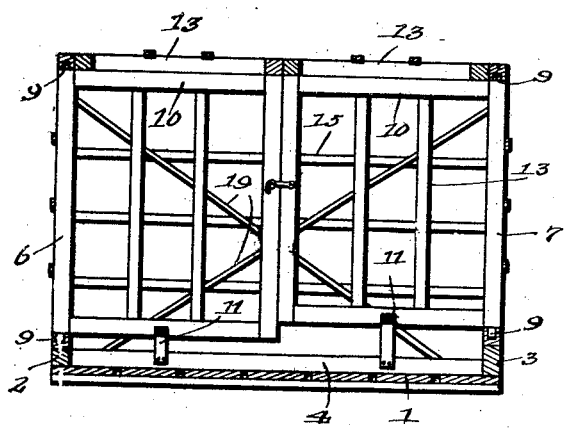
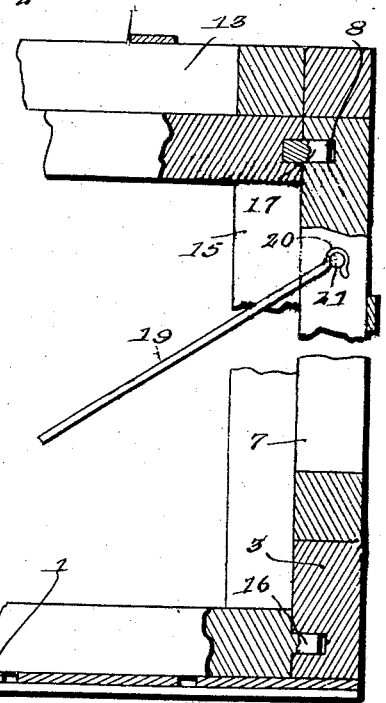
WITNESSES:
R. A. Thomas
INVENTOR
Douglas F. Black
BY
Victor J. Evans
ATTORNEY D. F. BLACK.
COLLAPSIBLE POULTRY CRATE.
APPLICATION FILED FEB. 12, 1919.
1,340,815.
Patented May 18, 1920.
2 SHEETS—SHEET 2.
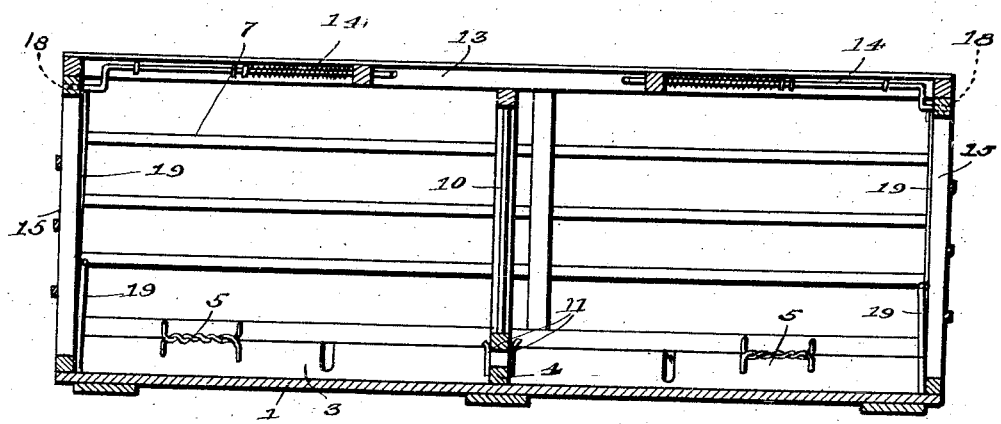
Fig. 3.
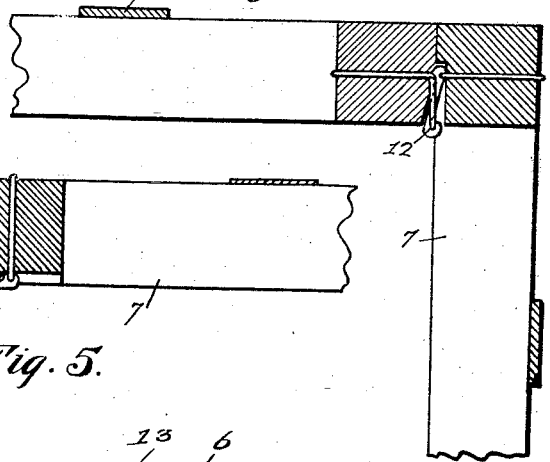
Fig. 6.
Fig. 7.
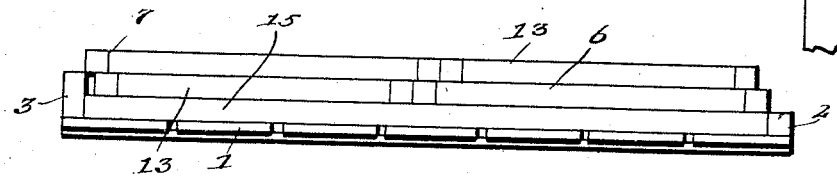
Fig. 5.
WITNESSES:
R. A. Thomas
INVENTOR
Douglas F. Black.
BY
Victor J. Evans
ATTORNEY

UNITED STATES PATENT OFFICE.

DOUGLAS FRASER BLACK, OF TOFIELD, ALBERTA, CANADA.

COLLAPSIBLE POULTRY-CRATE.

1,340,815.    Specification of Letters Patent.    Patented May 18, 1920.

Application filed February 12, 1919. Serial No. 276,586.

*To all whom it may concern:*

Be it known that I, DOUGLAS F. BLACK, a subject of the King of Great Britain, residing at Tofield, in the Province of Alberta, and Dominion of Canada, have invented new and useful Improvements in Collapsible Poultry-Crates, of which the following is a specification.

This invention has reference to a collapsible poultry crate, and has for its primary object to produce a crate of this character which may be easily set up and rigidly sustained in such position, and as readily collapsed to provide a small package for return shipment or for storage.

Other objects and advantages will appear as the nature of the invention is better understood, reference being had to the accompanying drawing, in which:

Figure 1 is a perspective view of the improvement in its set up condition.

Fig. 2 is a sectional view approximately on the line 2—2 of Fig. 1.

Fig. 3 is a sectional view approximately on the line 3—3 of Fig. 2.

Fig. 4 is a detail sectional view through one of the corners showing the engagement between one of the ends and one of the sides of the crate.

Fig. 5 is a view showing the crate in its collapsed condition.

Fig. 6 is a detail sectional view showing the hinged connection between one of the top members and one of the sides of the crate.

Fig. 7 is a section taken through the top 13 and the side 7 in open position.

The crate includes a base 1 which is preferably slatted and is provided, at its edges with upstanding cleats 2 and 3 respectively. The cleat 3 is of a greater height than the cleat 2. In addition to the cleats 2 and 3 the base has a central transverse cleat 4 of a height approximately equaling that of the cleat 2.

Hingedly secured to the cleats 2 and 3, as indicated by the numerals 5 are the sides 6 and 7 of the crate. The side 6 is of a greater height than the side 7, so that both of the sides have their outer edges flush or in the same line when the crate is set up. The end posts of the sides, adjacent the outer ends thereof are each provided with a socket 8. The top and bottom rails of the sides 6 and 7 have additional sockets that receive therein trunnions 9 on the ends of the outer posts of the gates 10 that provide a partition for the crate. The cleat 4 is provided with pairs of upstanding fingers 11 designed to receive therebetween the respective gates 10 when the same are swung transversely of the base to divide the crate into compartments.

Hingedly secured to the outer longitudinal bars of the sides 6 and 7, as at 12 are frames 13 that constitute the top of the crate. Both of the frames 13 are hingedly connected to the inner edges of the outer longitudinal members of the sides as disclosed by the drawings, and when the outer frames are brought over the crate the outer longitudinal bars thereof are disposed opposite each other and over the gates 10 that, as previously stated, provide the partition. Each of the frames 13 adjacent its outer edge is provided with a longitudinally movable spring influenced bolt 14 which normally is projected beyond the ends of the frames.

The ends of the crate are indicated by the numerals 15. Each of these ends has its lower longitudinal bar provided with trunnions 16 that are received in sockets in the cleats 2 and 3 and its upper or outer longitudinal bar provided with projections in the nature of dowel pins 17, which latter are adapted to be received in the sockets 8 of the sides 6 and 7, when the ends 15 are set up and the sides brought against the said ends. The referred to outer or upper bars of the ends 15 are provided with additional sockets 18 designed to receive the bolts 14 whereby to hold the top frames 13 locked on the remainder of the structure.

Loosely secured to the base 1 adjacent to the outer corners thereof are rods 19. Each of the rods has a hooked end which is indicated by the numeral 20. These hooked ends are designed to engage with studs 21 on the inner face of the end or corner bars of the sides 6 and 7. By reference to the drawings it will be noted that each pair of rods are arranged angularly with respect to each other and the said rods effectively sustain the sides in proper set up condition.

In collapsing the crate the spring pressed bolts are brought out of engagement with the ends and the gate members are swung beneath the longitudinal upper and lower bars of the sides. The hook bars are released from engagement with the sides and are folded over the base. Thereafter the ends 15 are swung over the base. It will be apparent that a slight pressure in an outward direction on the sides 6 and 7 is necessary to release the gates from their engagement with the fingers 11, and when the gates are swung between the upper and lower longitudinal members of the sides, the frames constituting the top are brought to aline with the respective side members to which they are hingedly secured. Thereafter the side 6 and the frame 13 carried thereby is swung over the folded ends, and the side 7 and the frame carried thereby is then swung over the side 6 and the frame carried thereby. It will thus be noted that the device can be readily collapsed to provide a small compact package for return shipment or for storage. It will be further noted that the device, when in a set up condition is amply braced so as to present a sturdy staple structure, and while I have illustrated and described the preferred embodiment of the invention as it now appears to me, such changes therefrom may be made as fall within the scope of what is claimed.

Having thus described the invention, what is claimed as new, is:—

1. A collapsible crate including a base having longitudinal cleats on the edges thereof, one of said cleats being of a greater height than the other, side members hingedly secured to the cleats, top frames hingedly secured to the sides, spring pressed locking bolts carried by the latter, end members trunnioned on the cleats, interengaging means between the end members and the sides when the crate is in its set-up condition and said ends having sockets to receive the spring pressed bolts of the top frames, brace rods loosely connected to the base and designed to engage with the sides for sustaining said sides in set-up condition.

2. A collapsible crate including a base having longitudinal cleats on the edges thereof, one of said cleats being of a greater height than the other, side members hingedly secured to the cleats, top frames hingedly secured to the sides, spring pressed locking bolts carried by the latter, end members trunnioned on the cleats, interengaging means between the end members and the sides when the crate is in its set-up condition and said ends having sockets to receive the spring pressed bolts of the top frames, brace rods loosely connected to the base at the corners thereof, said rods having hooked ends, and the sides having studs designed to receive the said ends of the said rods.

3. In a collapsible crate a base having longitudinal cleats at the ends thereof, one of which being of a greater thickness than the other, a transverse cleat on the base between the longitudinal cleats, fingers on the latter, sides hingedly connected to the longitudinal cleats, a frame comprising a top section of the crate hingedly connected to each of the sides, a gate trunnioned on each of said sides and adapted to be swung transversely of the base over the transverse cleats and between the fingers thereof, spring pressed bolts carried by the top frames, end frames trunnioned on the longitudinal cleats of the base, said end frames having their outer members provided with dowels, the end members of the side frames having sockets to receive the dowels, said end members having sockets to receive the bolts of the top frames, studs on the end posts of the side members, rods loosely secured to the corners of the base, and said rods having hooked ends adapted to engage with the studs on the side frames to support said side frames in their set up condition.

4. In a collapsible crate, a base, side members, end members and top members, and partition members having at their upper ends trunnions received in sockets in the top and bottom portions of the side members for hingedly connecting said partition members to said side members, means for latching the partition members when the same are brought into longitudinal alinement, a transverse cleat on the base, and upstanding fingers arranged in pairs and secured to the opposite sides of the cleat and receiving therebetween the lower rail of the partition members when the said partition members are brought together and in longitudinal alinement with the cleat.

In testimony whereof I affix my signature.

DOUGLAS FRASER BLACK.